(12) United States Patent
Choi

(10) Patent No.: US 9,812,045 B2
(45) Date of Patent: Nov. 7, 2017

(54) LARGE PROJECTION SCREEN IMAGE DEVICE WITH SEESAW STRUCTURE FOR VIRTUAL REALITY

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 26 days.

(21) Appl. No.: 14/986,849

(22) Filed: Jan. 4, 2016

(65) Prior Publication Data

US 2016/0209653 A1 Jul. 21, 2016

(30) Foreign Application Priority Data

Jan. 15, 2015 (KR) .......................... 10-2015-0007486

(51) Int. Cl.
*G09G 3/00* (2006.01)
*G03B 21/56* (2006.01)
*G09B 9/05* (2006.01)

(52) U.S. Cl.
CPC .......... *G09G 3/002* (2013.01); *G03B 21/562* (2013.01); *G09B 9/05* (2013.01)

(58) Field of Classification Search
CPC .......... A63G 1/32; A63G 11/00; A63G 13/06; A63G 15/00; A63G 23/00; A63G 31/00; A63G 31/02; A63G 31/16; A63B 69/00
USPC ............ 472/59–61, 106–107, 109–112, 130; 434/55
See application file for complete search history.

(56) References Cited

U.S. PATENT DOCUMENTS

| | | | | |
|---|---|---|---|---|
| 2,947,009 A * | 8/1960 | McKenzie | ............ | A47C 21/00 359/872 |
| 5,547,425 A * | 8/1996 | Krhs | ...................... | A63G 11/00 472/110 |
| 5,961,195 A * | 10/1999 | Yoshimatsu | ........... | G09B 9/058 353/122 |
| 6,902,402 B2 * | 6/2005 | McClintic | ................ | G09B 9/20 434/30 |
| 2013/0079167 A1 * | 3/2013 | Hasenzahl | ............... | A63G 1/10 472/60 |

FOREIGN PATENT DOCUMENTS

| | | |
|---|---|---|
| KR | 10-2003-0054984 A | 8/2003 |
| KR | 20-2010-0013407 U | 12/2010 |
| KR | 10-2012-0094228 B1 | 8/2012 |
| WO | 2009061828 A1 | 5/2009 |

* cited by examiner

*Primary Examiner* — Kien Nguyen
(74) *Attorney, Agent, or Firm* — Bacon & Thomas PLLC

(57) ABSTRACT

A large projection image screen device having a seesaw structure for virtual reality where a chair is provided on one side of a lever and an image system is provided on the other side of the lever. Several rotation shafts are provided below the lever for up down rotation, left right rotation and front rear rotation, where when the chair and the screen are rotated up and downward, left and rightward, and front and rearward, a user on the chair views the images at the same view angle as the rotation angle of the screen through a location tracing device.

17 Claims, 12 Drawing Sheets

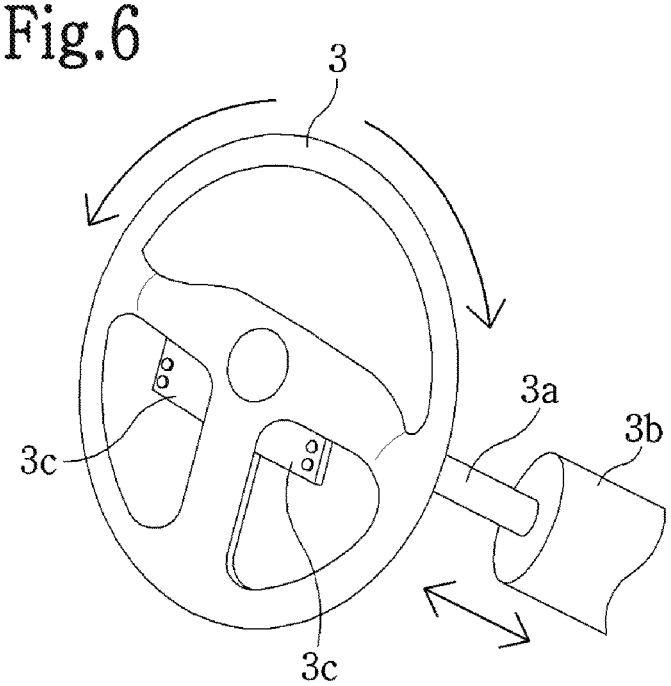

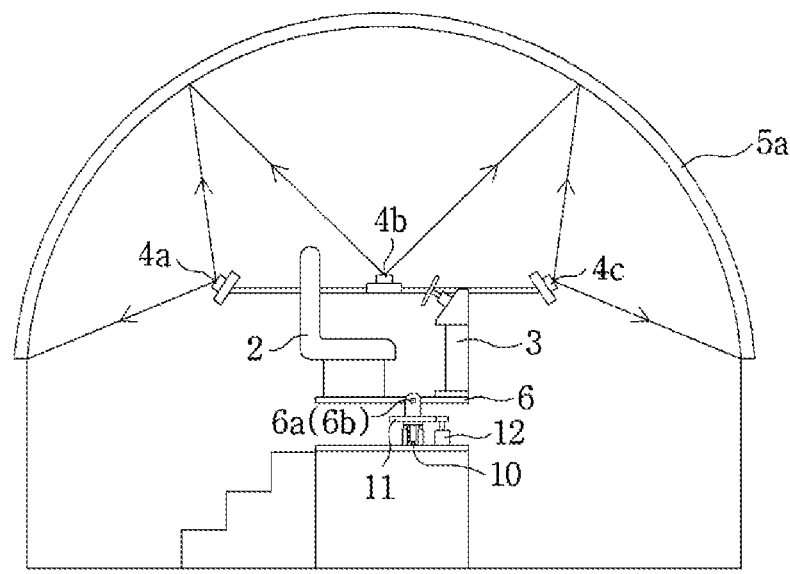
Fig. 7A
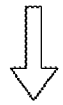
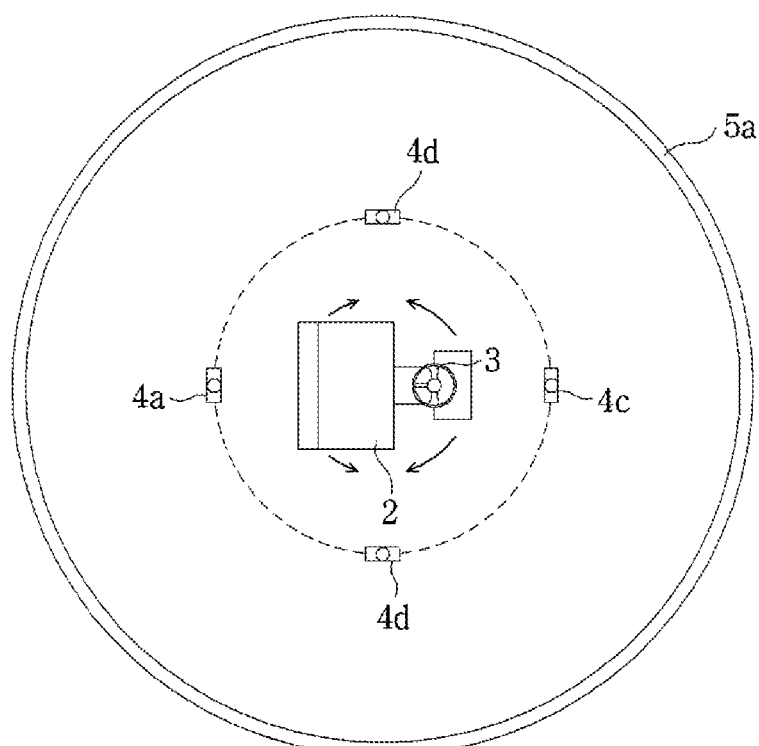
Fig. 7B

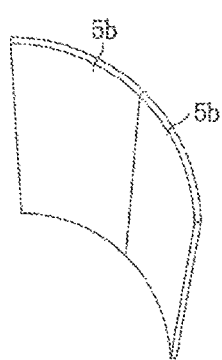 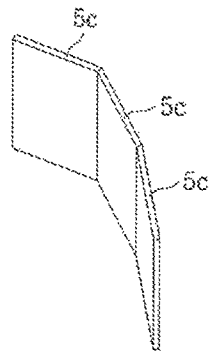 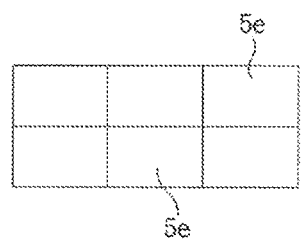
Fig. 8A    Fig. 8B    Fig. 8C
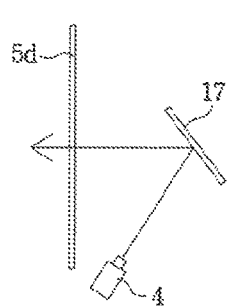 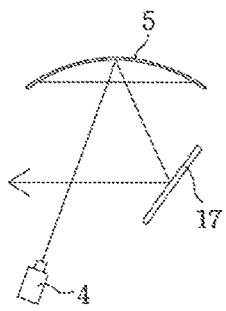 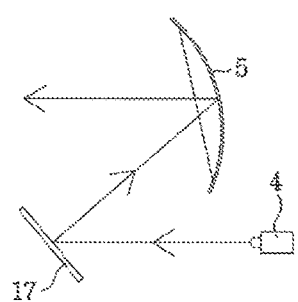
Fig. 8D    Fig. 8E    Fig. 8F
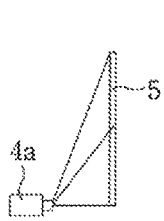 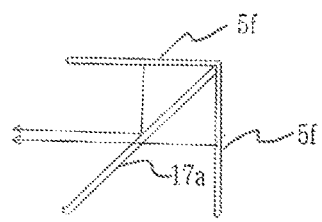
Fig. 8G    Fig. 8H

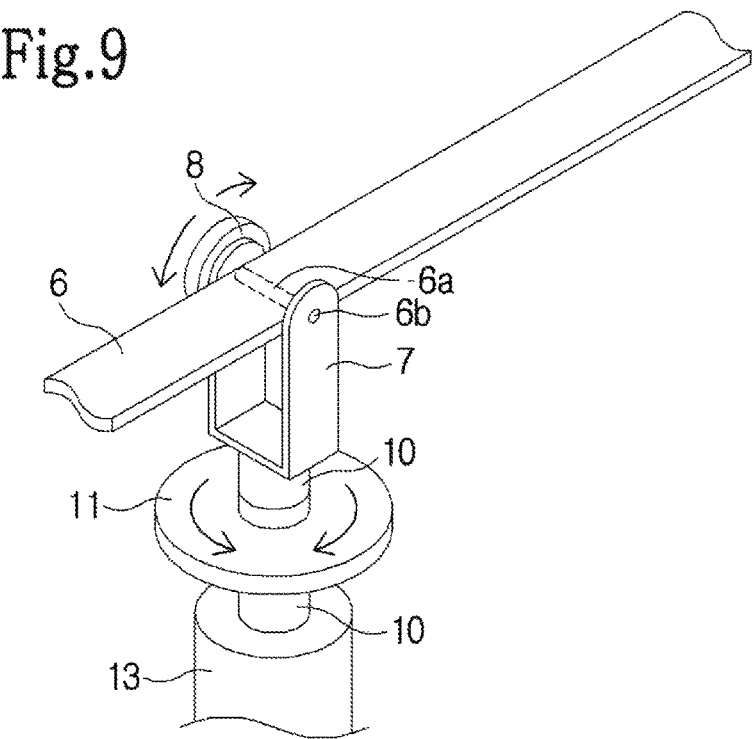

Fig. 11A
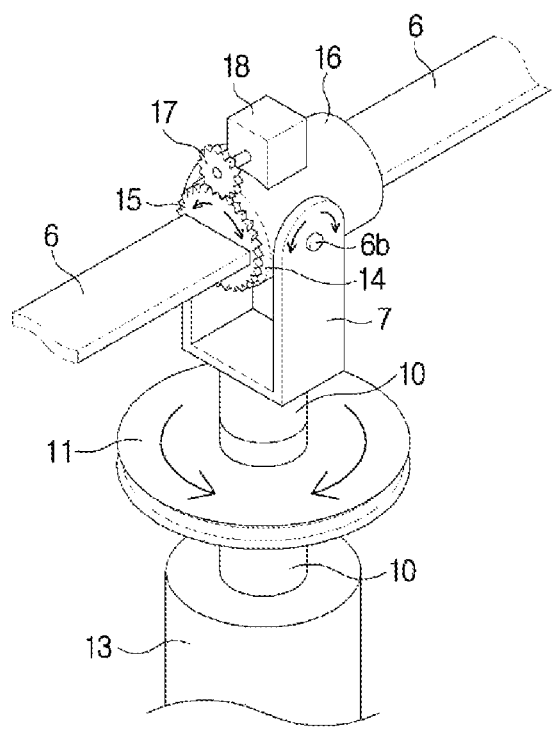
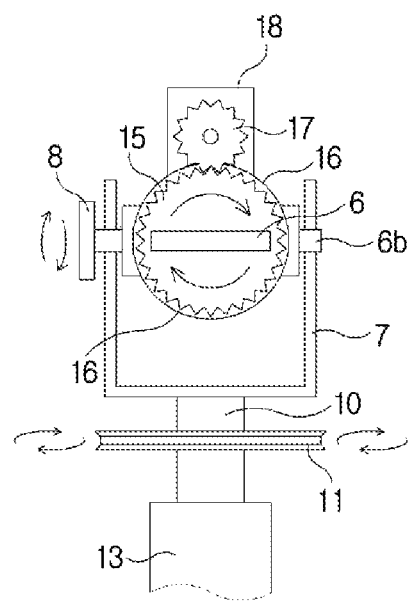
Fig. 11B

LARGE PROJECTION SCREEN IMAGE DEVICE WITH SEESAW STRUCTURE FOR VIRTUAL REALITY

CROSS-REFERENCE(S) TO RELATED APPLICATION

This application claims priority of Korean Patent Application No. 10-2015-0007486, filed on Jan. 15, 2015, in the Korean Intellectual Property Office, which is hereby incorporated by reference in its entirety.

BACKGROUND OF THE INVENTION

The present invention relates to an image device for implementing virtual reality images, and more particularly, to an image device for implementing virtual reality images, which is featured that a large screen and a movable chair are provided on a seesaw structure consisting of a lever and a fixing point located on the lever.

Recently, virtual reality devices for implementing virtual reality images using a smart phone and a head mounted device (HMD) have been introduced in a market. The virtual reality images have been developed differently from existing simulator images. That is, a conventional simulator is limited to a motion simulator where only left and right, and upper and lower parts are moved. However, according to a recent HMD, a positioning device traces a movement direction of a head of a user using a gyroscope, a horizontal direction location sensor and GPS, etc., inside a smart phone, and a front image is shown when the user glances at a front surface and the user changes his/her head to up down and left right directions, the up down and left right images corresponding to the head are shown.

However, the screen of mainly less than 10" in a small size is divided into two screen of less than 5" in a finite small and the three dimensional left and right images are displayed on the screen and observed by a user. Accordingly, it is impossible to view a large image up to 20" to 200" through the screen of the virtual reality image device.

Here, a location tracing sensor device such as a gyroscope, an acceleration sensor and a magnetometer is embedded in the virtual reality image device and a smart phone. When the location tracing sensor is rotated leftward based on a front surface, the left image is viewed, and when the location tracing sensor is rotated rightward or rearward, the right image or the rear image is viewed. Further, when a user views upward, the images of sky and a ceiling are viewed, and the user views below, the image of a floor or land is viewed.

Accordingly, when the screen device is rotated left and rightward based on a front location, the left and right images have to be viewed, when the screen device is rotated rearward, the rear image has to be viewed, and then the screen device is rotated up and downward, the up and down images have to be viewed, corresponding to the virtual reality images that are varied depending on the view angles. However, according to a motion simulator for virtual reality of a conventional art, there is only a simulator function by motion such that 6 legs for up down adjustment, 7 motors including the motor for controlling the legs are needed, thereby making the structure to be complicated.

Further, since the numbers of the motor increases, a plurality of programs for driving the motor are needed, and the images are fixed, the motion structure where only a chair is moved for viewing the fixed image is impossible for viewing the virtual reality image.

Accordingly, the raising and lowering structure by using 3 shafts can obtain only motion simulator effects but it cannot provide the images that are rotated corresponding to the view angle of a user who rotates.

In a case of the screen device disclosed in PCT/US2008/082493, the left right rotation is impossible when the coheres pouching tilt of a seat is provided by using a plurality of cables with 3 shafts.

Further, referring to the feeling chair and a feeling device for education using the same, disclosed in Korean Patent Application No. 10-2003-0054984, only the images in an up down direction on a front surface can be provided by using hydraulic cylinder or pneumatic cylinder, which is limited to vibration operation and tilting operation, and the images in a front rear direction cannot be provided.

Referring to the chair for theater through which 3D is felt, disclosed in Korean Utility Model Application No. 20-2010-0013407, a plurality of air springs are provided to be vibrated up and downward and the front rear and the left right images cannot be provided, which is required recently for virtual reality images.

In particular, in a large size of image device such as a screen, its weight is heavy and thus it is impossible to rotate it.

Referring to the motion simulator, disclosed in Korean Patent Application No. 10-2012-0094228, 4-7 motors are usually required by 3 rotation devices. Further, a circular chain structure and a plurality of sprockets corresponding thereto are required for the rotation, and further a plurality of rods, link members and connection members are required.

Accordingly, the existing motion simulator structures as described above are not proper for providing 3D images and are configured mainly for tilt function. In addition, a plurality of motors are used for each operation element without functions for considering mechanical efficiency at every operation element, and thus their volumes are large, cost much and failure places becomes many.

SUMMARY OF THE INVENTION

The present invention has been proposed to solve the drawback as described above and an aspect of the present invention is directed to a large projection screen image device with seesaw structure for virtual reality, in which the up down, left right and front rear rotation structures are configured as a simple driving structure to provide images.

According to an embodiment of the present invention, the left right rotation, up to 360° at a maximum level, is possible by one rotation shaft, the up down and front rear rotation is possible by one rotation shaft, a location tracing device into which a gyroscope, an acceleration sensor, magnetometer, GPS, etc., is provided on one of moving parts, and the image device, the location tracing device, the screen and the chair are rotated simultaneously at left and rightward 360° and up and downward by one lever.

That is, the large projection screen image device is configured as a seesaw structure having a lever and a fixing point of the lever wherein a front rear rotation shaft is provided on the fixing point, the lever is rotated up and downward and left and rightward at the fixing point based on the horizontal direction, a left right rotation shaft is provided below the front rear rotation shaft, the up down rotation shaft is provided at a center of the front rear rotation shaft, a chair is provided on one side of the lever, and one of the screen for projection and the image monitor is provided on the other side of the lever. Accordingly, the corresponding image can be viewed by a user on the chair in accordance with the view direction of the rotation movement of the user.

Further, the location tracing device consisting of a gyroscope, an acceleration sensor, magnetic sensor, GPS, infrared sensor, etc., is embedded into one of the chair, the projector, the screen, the control box and the lever.

In addition, the screen device is configured with one of a large monitor, a rear screen and a reflection mirror, and a projector, or the screen device is configured such that a screen is provided on a ceiling direction, a reflection mirror and a half-transparent mirror are provided an oblique angle at a middle part and the projector is provided below, or the screen device is configured such that a reflection mirror is provided on a lower front surface of a screen and a projector is provided on a lower rear surface of the screen to form a screen device.

A whole structure of the large projection screen image device of the present invention is configured as a seesaw structure having a lever and a fixing point of the lever wherein a front rear rotation shaft is provided on the fixing point of the lever, a left right rotation shaft is provided below the front rear rotation shaft, an up down rotation shaft is provided inside the front rear rotation shaft, a chair is provided on one side of the lever, and an equilibrium weight pendulum is provided on the other side of the lever wherein the corresponding image is viewed in accordance with the view direction of the rotation movement of the user on the chair.

Here, the screen is configured such that two projectors are used as a pair to provide 3D image or is provided with 3D monitor to provide 2D image as well as 3D image.

The weights of a chair, a user and a large screen are heavy. According to the present invention, the large projection screen image device is configured as a seesaw structure of a lever configuration wherein a chair is arranged on one side of the lever and a screen structure is arranged on the other side of the lever, a fixing point of the lever is set on a weight center of the components arranged on both sides, and the up down rotation shaft, the left right rotation shaft of 360° and the front rear rotation shaft are provided on the fixing point of the lever such that the weights of a user and a chair and the weight of the screen structure are balanced as a symmetrical operation. Accordingly, small force 1/10 times as a conventional art is required to rotate the device.

Meanwhile, according to the large projection screen image device of seesaw structure, only 2-3 motors are used to rotate the device front and rearward, left and rightward, and up and downward, comparing to the simulator structure of a conventional art where 7 motors are usually used.

Further, the chair, the screen and the image providing device are moved simultaneously by one front rear rotation shaft and one left right rotation shaft of 360° and a location tracing device is provided into one of the chair, the screen and the image providing device such that the image displayed on the screen is provided in accordance with the angle and direction of the rotation while the screen is rotated left and rightward 360° and up and downward by the rotation shafts.

That is, when the screen is rotated leftward, the left direction view image is viewed, when the screen is rotated rightward, the right direction view image is viewed, when the screen is rotated rearward, the rear direction view image is viewed, and when the screen is rotated up and downward, the ceiling direction view image is viewed from the ceiling and the loser direction view image is viewed from the bottom.

Accordingly, a large screen device of greater than 50 M diagonal can be configured in the screen device 200 having 1 to 30 chairs and further all components can be arranged on one lever having a fixing point and thus the volume of the system can be reduced to the volume 1/10 times as the motion simulator of a conventional art.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 6 is a view of a control box of a large projection screen image device with a seesaw structure for virtual reality according to the present invention;

FIG. 7A is a view of a large projection screen image device with a seesaw structure for virtual reality which is combined to a dome type screen according to the present invention;

FIG. 7B is a view of a chair of a large projection screen image device with a seesaw structure for virtual reality, which is rotated, according to the present invention;

FIG. 8A is a view of a screen of a large projection screen image device with a seesaw structure for virtual reality according to one embodiment of the present invention;

FIG. 8B is a view of a screen of a large projection screen image device with a seesaw structure for virtual reality according to another embodiment of the present invention;

FIG. 8C is a view of a screen of a large projection screen image device with a seesaw structure for virtual reality, which is provided in a multi type, according to another embodiment of the present invention;

FIG. 8D is a view of a short throw projector of a large projection screen image device with a seesaw structure for virtual reality according to the present invention;

FIG. 8E is a view of a rear screen of a large projection screen image device with a seesaw structure for virtual reality according to the present invention;

FIG. 8F is a view of a projection structure of a large projection screen image device with a seesaw structure for virtual reality according to the present invention;

FIG. 8G is a view of a projection system of a reflection mirror of a large projection screen image device with a seesaw structure for virtual reality according to the present invention;

FIG. 8H is a view of a projection system of a large projection screen image device having two monitors and a half-transparent mirror with a seesaw structure for virtual reality according to the present invention;

FIG. 9 is a view of front and rear rotation shafts and left and right rotation shafts of a large projection screen image device with a seesaw structure for virtual reality according to the present invention;

FIG. 11A is a view of front and rear, left and right and up and down rotation structures of a large projection screen image device with a seesaw structure for virtual reality according to the present invention;

FIG. 11B is a cross-sectional view of front and rear, left and right and up and down rotation structures of a large projection screen image device with a seesaw structure for virtual reality according to the present invention.

DETAILED DESCRIPTION OF THE INVENTION

Figure 1:
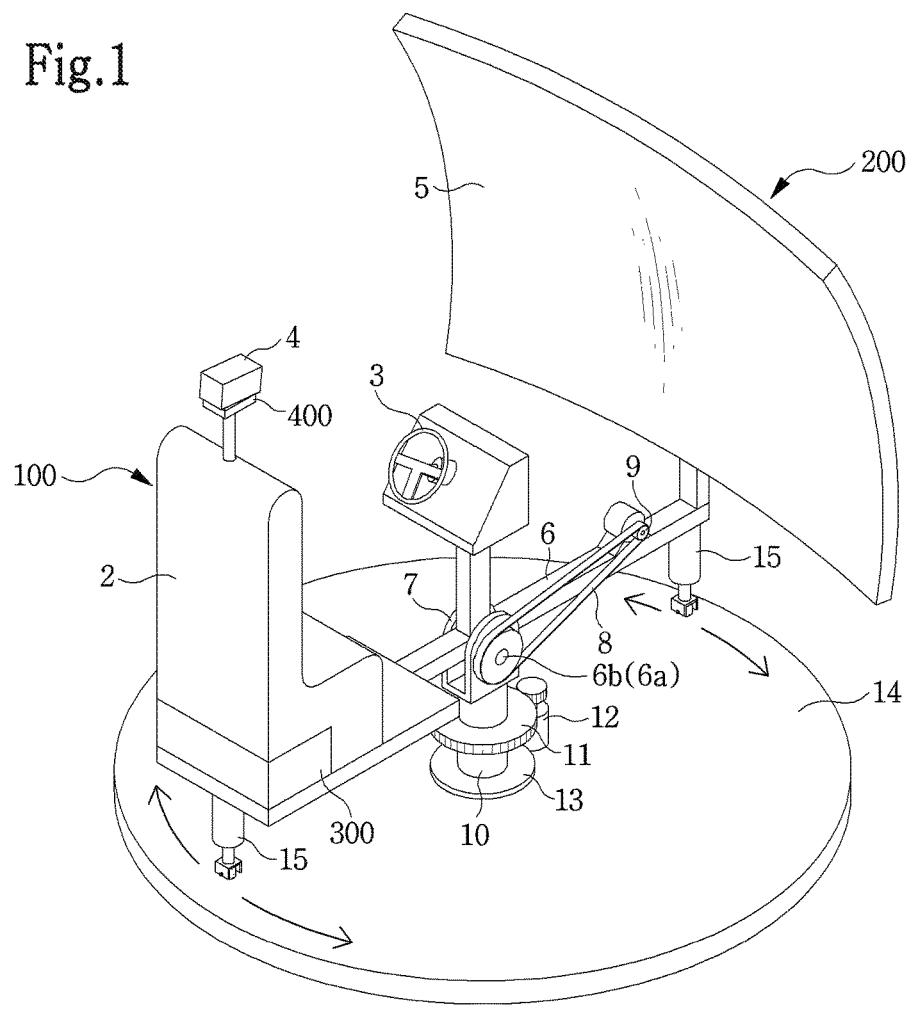
FIG. 1 is a perspective view of a large projection screen image device with a seesaw structure for virtual reality according to the present invention.

Exemplary embodiments of the present invention will be described below in detail with reference to the accompanying drawings. Wherever possible, the same reference numerals will be used to refer to the same elements throughout the specification, and a duplicated description thereof will be omitted.

A lever of a large projection screen image device with a seesaw structure for virtual reality according to the present invention is featured as being a seesaw type. Here, the lever is operated based on a principle of momentum (rotation force)=force×distance. That is, as force is applied to a remote end of lever, a heavy object is moved with less force by using the lever.

The lever can be driven with less force of a motor when the large projection screen image device is rotated up and downward. That is, in case that the large projection screen image device is rotated left and rightward at 360°, when a chair is provided on one end of a lever based on a fixing point of the lever and a user seats thereon and a screen or a monitor is provided on the other end of the lever, it is driven with a less force than 1/10 times as a conventional device being applied to the fixing point of a weight center in a symmetrical configuration to both directions. Further, when a front and rear rotation shafts are provided on the fixing point of the lever, it is rotated with small force.

Accordingly, the large projection screen image device according to the present invention is configured based on the above principle as follows.

Figure 2:
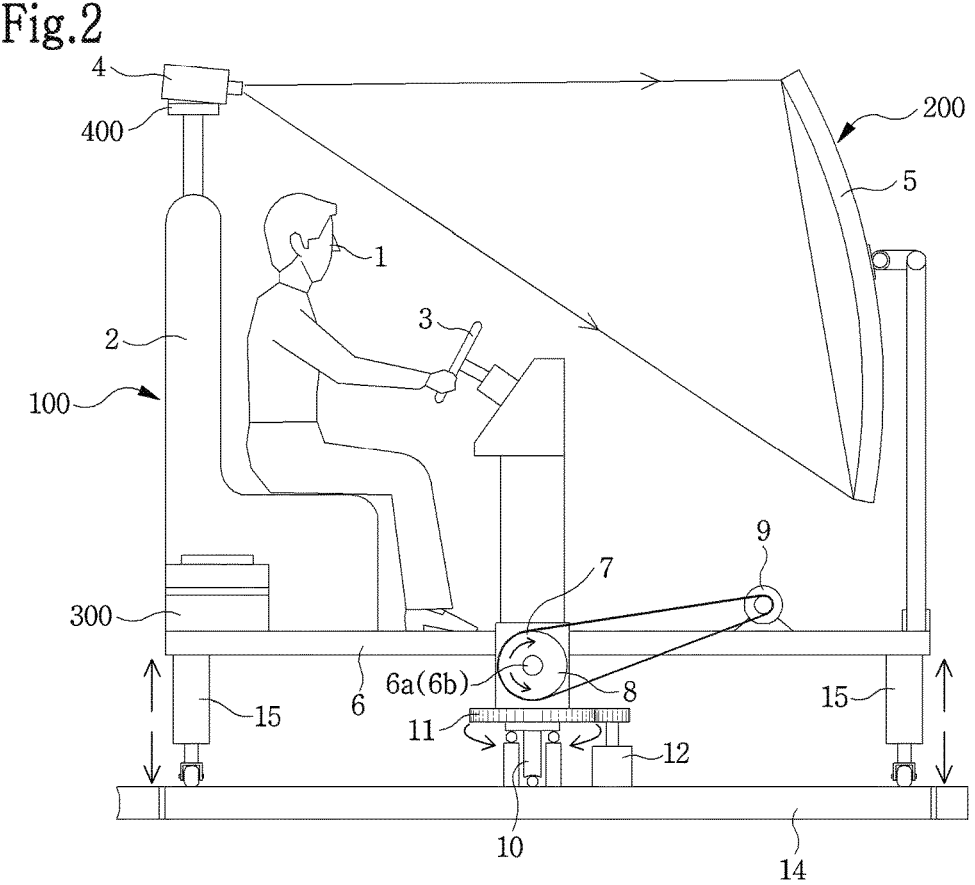
FIG. 2 is a side view of a large projection screen image device with a seesaw structure for virtual reality according to the present invention.
Figure 5:
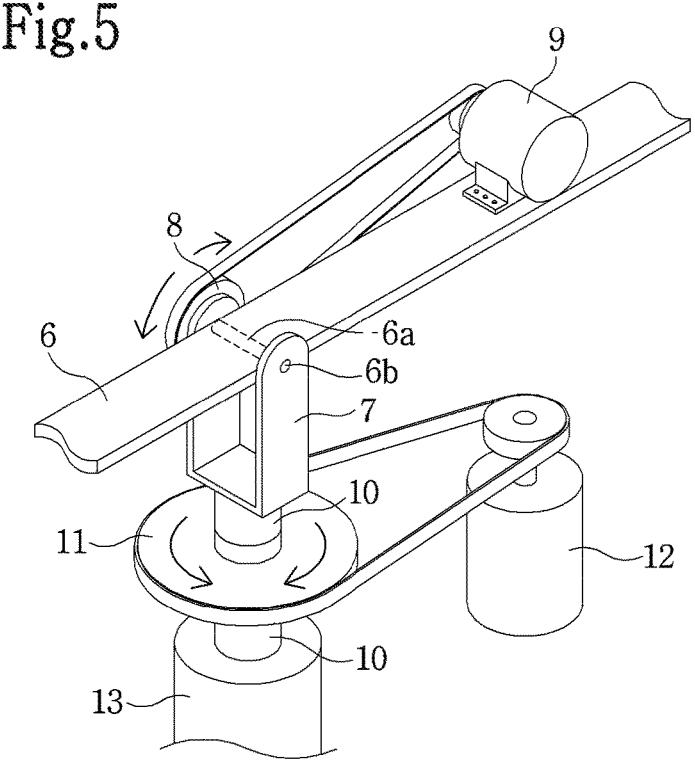
FIG. 5 is a view of a seesaw structure and a lever fixing point 6a of a large projection screen image device with a seesaw structure for virtual reality according to the present invention.

Referring to FIGS. 1, 2 and 5, the whole structure of the device is configured as a seesaw type in which a fixing point is set on a lever and a seat and a person who seats on the seat are disposed on one end of the lever based on the fixing point and a screen or a monitor are disposed on the opposite end thereof. Here, the person, chair, a large screen and a large screen are heavy-weighted. Accordingly, when the fixing point 6a of the lever is set by adjusting properly the distances of the lever 6 from the point where the chair is located to the fixing point and from a location where a screen device 200 is disposed to the fixing point, considering the weights of the above components, the large projection screen image device can be rotated left and rightward at 360° and up and downward with 1/10 times force as the conventional structure.

That is, as shown in FIGS. 1 and 2, the present invention includes: a lever 6 provided horizontally; a fixing point 6a of the lever set on a weight center of the lever 6; a chair 2 provided based on one end of the lever 6 based on the fixing point 6a, on which a user seats; a projector 4 provided above the chair; a control box 3 provided on a front of the chair; a screen device 200 provided on a front of the control box; and an extremely large screen 5 for providing an image up to 40-200" provided on the other end of the horizontal lever 6 wherein the above components are moved simultaneously together in accordance with the movement of the lever 6.

Meanwhile, as shown in FIGS. 1 and 5, an up down rotation shaft 6b is provided on the fixing point 6a of the lever and a front and rear rotation wheel 8 provided on one end of the up down rotation shaft is connected to a driving motor 9 provided on one side of the lever 6 through gears or belt.

Additionally, a left and right rotation shaft 10 that rotates at 360° is provided with a left and right rotation wheel 11 below the front and rear rotation shaft 6b and is connected to a left and right rotation motor 12. Here, a floor plate 14 is provided below the left and right rotation shaft 10 and bearing are provided between the floor plate 14 and the left and right rotation shaft 10 so as to make smooth rotation therebetween. If necessary, a buffering device 15 may be provided below the chair 2 or the screen 5, the vertical length of which can be adjusted by elastic unit such as spring, such that the lever 6 is rotated smoothly. Here, rotation wheels may be provided on the buffering device 15.

The weight load of the buffering device 15 configured as described above is reduced to 1/3 since when the lever 6 rotates left and rightward at 360°, the weight of the buffering device is divided into three parts by the left and right rotation shaft 10 and the left and right buffering devices 15.

Addition, the weight of the components arranged on a basis of the fixing point 6a is distributed symmetrically to both directions and thus the load thereof is reduced to 1/10.

As shown in FIG. 6, the control box 3 is provided on an upper part of the lever 6, a front of the chair 2, to be linked to the up and down driving motor 9 and the left and right rotation motor 12. When the handle of the control box 3 is rotated left and rightward, the left and right rotation motor 12 is rotated left and rightward to rotate the lever 6 left and rightward, and when the handle is pushed and pulled front and rearward, the up and down rotation motor 9 is driven to rotate the lever 6 up and downward.

Figure 4:
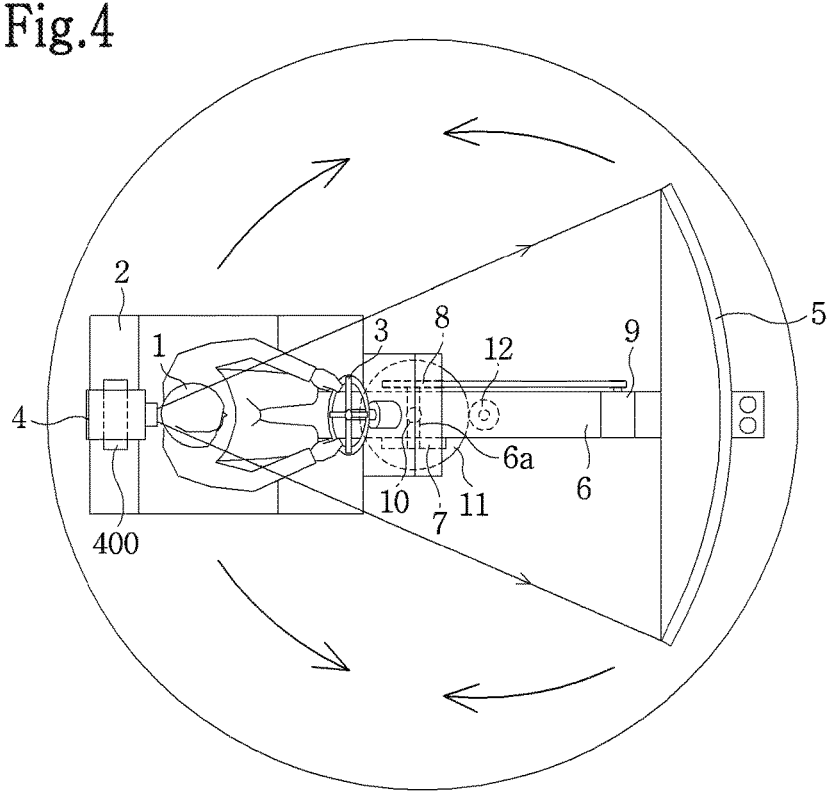
FIG. 4 is a view of a large projection screen image device with a seesaw structure for virtual reality, which is rotated at left and right 360°, according to the present invention.

According to the present invention, as shown in FIG. 4, the handle of the control box 3 is rotated left and rightward and up and downward, the left and right rotation motor 12 and the up and down rotation motor 9 are driven, and as a result the lever and the chair provided on the lever are rotated left and rightward and up and downward at 360°.

Figure 3:
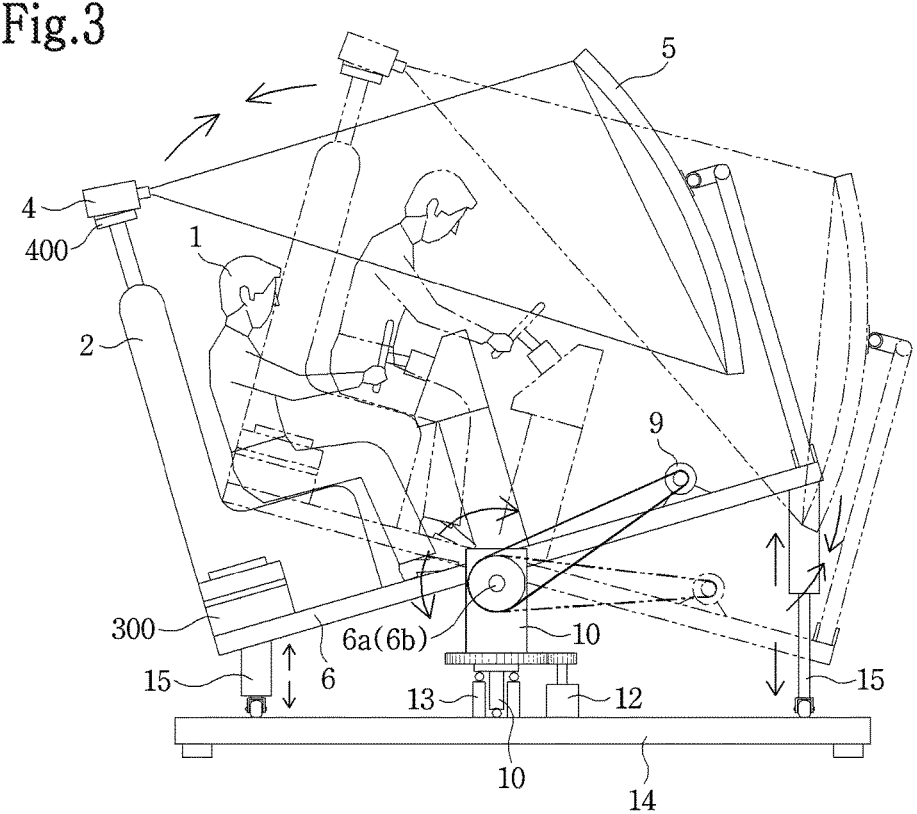
FIG. 3 is a view of a large projection screen image device with a seesaw structure for virtual reality, which is rotated up down, according to the present invention.

Accordingly, the large projection screen image device of the present invention in a seesaw structure is rotated up and downward as shown in FIG. 3, or is rotated up and downward, left and rightward and front and rearward simultaneously to three directions as shown in FIG. 4.

Meanwhile, as shown in FIG. 1, a computer device into which stop images of 360° up and down and left and right or mobile images are housed or supplied from internet is provided on the image providing device 300 wherein the image is embedded in a smart phone and the image corresponding to the location and the direction of the person and the screen that rotate up and down, left and right and front and rear, which is traced and calculated by the location tracing device 400 consisting of a gyroscope, an acceleration sensor, magnetic sensor, GPS. etc., is provided on the screen.

The location tracing device 400 may be replaced with a smart phone or a tablet personal computer into which the image providing device 300 and the location tracing device 400.

The location tracing device 400, or the smart phone or the tablet personal computer may be installed on one of the projector, the chair, the screen device 200, the lever 6, etc., to be connected to the projector or the monitor.

Meanwhile, a speaker is arranged on the screen device 200, the chair 2 or other places necessary for the speaker. Accordingly, the large projection screen image device of the present invention is featured that the chair 2, the projector 4, the control box 3, the screen device 200 and the location tracing device 400 are rotated simultaneously by one lever 6. Here, the number of the chair is not limited to one, but it may be a plurality such as two, four and six to twenty five.

That is, when the chair 2 is heavy and the opposite screen 5 is light based on the fixing point 6a of the lever, the distance of the lever 6 at the side where the chair 2 is provided becomes shorter and the distance at the side where the screen 5 is provided becomes longer. On the contrary, when the screen 5 at one side of the lever is heavy and the chair 2 at the opposite side is light, the distance of the lever is arranged to be opposite to the above configuration. Accordingly, according to the seesaw structure of the large projection screen image device of the present invention, the up and down and left and right rotation devices are provided on the location of the fixing point 6a of the lever so that the device can be rotated easily by the operation of a lever.

Further, the images are provided as upper and lower images in accordance with the changes of observation location of a user at front and rear and left and right 360° and at the front and rear and the left and right rotation locations based on a front surface.

According to the present invention, the image screen or the monitors may be curved or continuous-contacted left and rightward as shown in FIG. 8A, they may be directed to three directions as shown in FIG. 8B, they may be connected in a multi type by using existing image screen or monitors as shown in FIG. 8C, they may form one system where one transmission type screen 5d, or a reflection mirror 17 on a rear side of the transmission type screen and a projector 4 below the mirror are provided. Further, as shown in FIG. 8E, one system is configured such that the projector 4 is provided on a lower part, the screen 5 for projection is provided on a ceiling location of an upper part and the reflection mirror 17 is provided on a front of the screen, and thus the image of the screen 5 for projection on a ceiling can be viewed through the reflection mirror 17.

Meanwhile, as shown in FIG. 8F, the reflection mirror 17 is provided at an oblique angle below the screen 5 for projection and the projector 4 is provided at a rear end of the image screen such that the image from the projector 4 that is projected from a rear surface below the screen 5 for projection is reflected from the reflection mirror 17 at a front side of the image screen toward the image screen. Accordingly, the projection distance of the projector 4 can be reduced to a half.

As shown in FIG. 8G, a short throw projector 4a having a short focal distance and the image screen may form one system and the screen device 200 may be formed as one system.

The one embodiment of the screen device 200 is implemented on the opposite direction to the chair 2 based on the fixing point 6a of the lever 6. The structure of the screen device 200 may be applied to 3D picture equally. That is, the 3D image for left eye and the 3D image for right eye are provided simultaneously so as to provide 3D image wherein they have to be provided simultaneously in an overlapping manner on one screen. Accordingly, in cases of FIG. 8A, 8B, 8C, 8D, 8E, 8F, 8G two projectors 4 are provided as one set and the monitor has to be replaced with a 3D monitor. However, in a case of FIG. 8H, two monitors 5f are arranged at a right angle and a half-transparent mirror 17a is arranged obliquely at 45° therebetween such that 50% of the image is transmitted and the rest is reflected, or 20-80% is transmitted and 80-20% is reflected. According to the configuration described above, the left eye image for 3D image is input on one monitor of two monitors 5f and the right eye image for 3D image is input on the rest of the two monitors 5f wherein one image is transmitted through the half-transparent mirror 17a and the other image is reflected from the half-transparent mirror and then the left eye image and the right eye image are combined on one screen for the 3D image to be reviewed.

Figure 12:
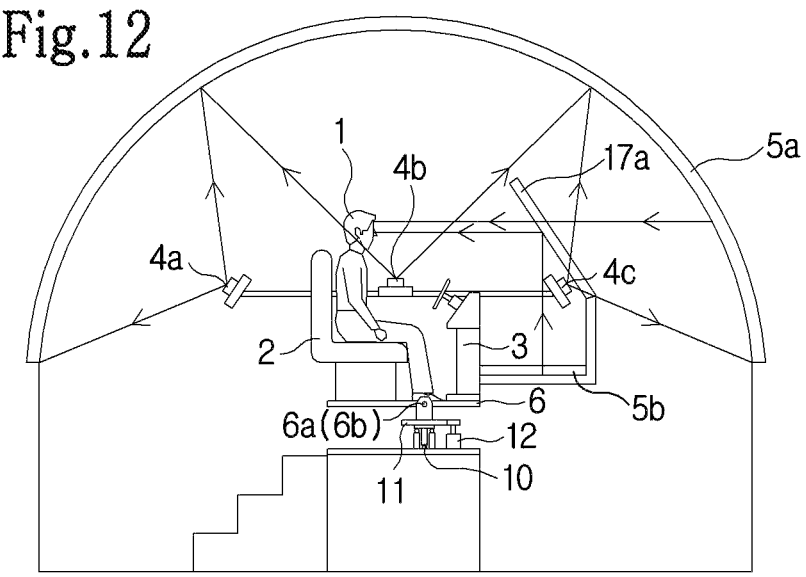
FIG. 12 is a view of a dome screen in use of a large projection screen image device with a seesaw structure for virtual reality according to the present invention.

As shown in FIG. 12, the half-transparent mirror 17a is provided at an oblique angle on an opposite side to a user 1 who seats on the chair 2 based on the fixing point 6a of the lever, that is, between the fixing point 6a of the lever and the dome screen 5a, and a second image screen 5b provided on a monitor is arranged on an upper part or a lower part at a reflection angle location of the half-transparent mirror 17a. According to the configuration described above, the image on the second image screen 5b is reflected from the half-transparent mirror 17a to transmit to the user 1 and thus the user 1 can view simultaneously the image on the dome screen 5a, which is transmitted through the half-transparent mirror 17a, and the image on the second image screen 5b. This configuration is useful for a virtual reality game device, for example, the second image screen 5b is configured for battle training and as a shooting device such as a tank and gun while playing a game and the image on the dome screen 5a is provided with a target image. In this case, the user 1 may view the image on the dome screen image 5a while he/she rotates simultaneously together with the second image screen 5b as if he/she views freely the up down, left right and front and rear images of the dome screen 5a on a center of a ceiling while he/she rotates. Accordingly, the user may experience directly a virtual game or battle.

Accordingly, according to the configuration of the present invention, the virtual reality images that are changed depending on the rotating view angle can be viewed on a large screen as 2D or 3D images. Meanwhile, the large projection screen image device of the present invention can be driven with a reduced power of ½ to ¹⁄₁₀ times as a conventional motion simulator and thus can be applied to a 3D virtual reality device.

Embodiment 1

Figure 10:
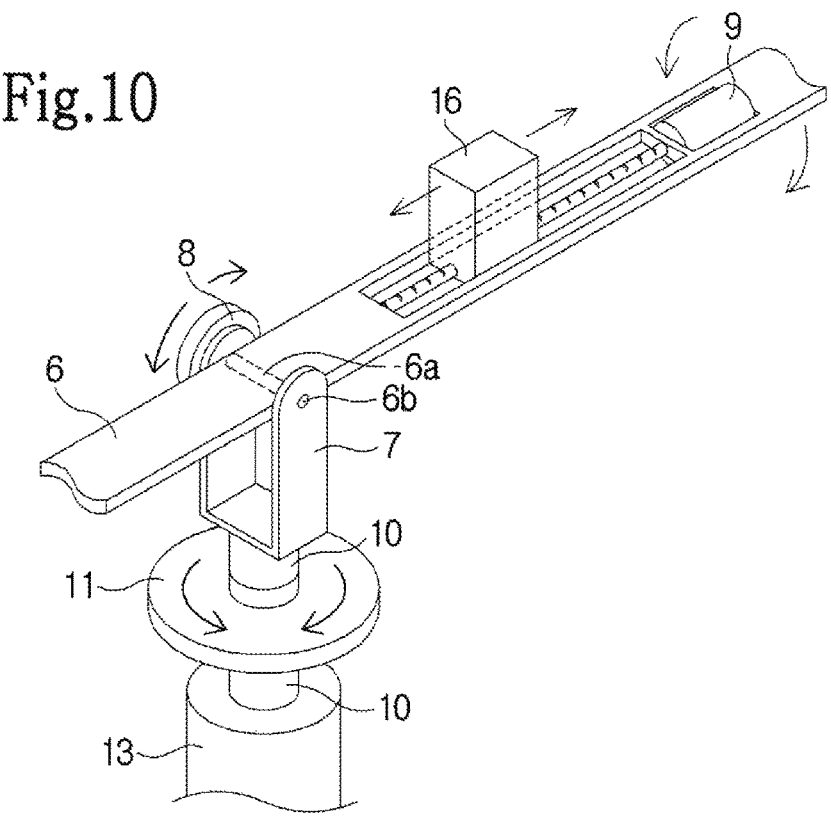
FIG. 10 is a view of a weight pendulum movement of a lever of a large projection screen image device with a seesaw structure for virtual reality according to the present invention.

As shown in FIGS. 7A and 7B, the large projection screen image device of the present invention is featured such that based on the fixing point 6a of a lever a chair 2 is provided on one side and a driving control box 3 is provided on an opposite side and further a rotation lever 6 provided with a motor is connected to a dome screen 5a. When there are limitations to setting the fixing point 6a of the lever due to the limitation to the length of the lever 6, a weight pendulum 16 is moved to adjust an equilibrium point of the lever, as shown in FIG. 10. That is, as the weight pendulum 16 is moved toward one end of the lever, the fixing point 6a of the lever is moved to the other side and as the weight pendulum 16 is moved to a center, the fixing point is moved to the central direction. By using the movement of the weight pendulum, the up and down movement of the lever is driven.

That is, the configuration of the seesaw is similar to that shown in FIG. 5, however, the chair 2 is arranged on a center of the dome screen 5a and the chair 2 is rotated up and downward while it is rotated left and rightward, as shown in FIG. 3, FIG. 4 and FIG. 7B. Accordingly, a plurality of projectors 4a, 4b, 4c, 4d are arranged on the dome screen 2 such that the images of greater than up down 60° and of greater than left right 200° to 360° are implemented and the chair 2 is rotated up downward and left rightward by the control box 3 for a user to view the virtual reality image.

In this case, the location tracing device 400 may be omitted. Further, the up down rotation motor 9 and the left right rotation motor 12 may be omitted. That is, the up down rotation shaft 6b and the left right rotation shaft 10 can be moved with propulsion force ⅒ times as a conventional motion simulator so that a user who seats on the chair 2 can rotates manually up and downward and left and rightward by using the floor plate 14 without motor power.

Further, the location tracing device 400 may be arranged on one of the chair 2, the projector 4, the control box 200, the screen 5 for projection and the monitor.

That is, according to the present invention, the above components are configured with one lever 6 and they are all moved together with the lever based on the fixing point 6a of the lever 6.

Embodiment 2

As shown in FIG. 11A and FIG. 11B, the lever 6 and the front rear rotation shaft 6b are inserted into an up down rotation plate 16 at an intersection location of the lever 6 and the front rear rotation shaft 6b such that the lever 6 is rotated up and downward at an oblique angle based on the left and right horizontal direction. That is, bearings (not shown) are embedded inside the up down rotation plate 16 such that the lever 6 combined with the bearings inside the up down rotation plate 16 is rotated up and downward at an oblique angle based on the left right direction. When the front rear rotation shaft 6b rotates up and downward, the rotation chair 100, the rotation screen device 200, the image device 300 and the location tracing device 400 are rotated simultaneously. According to this configuration, when an air craft, a spacecraft or a game device are driven, a driver on the rotation chair 100 rotates left and rightward at an oblique angle such that the image on the rotation screen device 200 is provided at the same oblique angle by the location tracing device 400.

Accordingly, the large projection screen image device of the present invention can be rotated up down, left right and front and rear based on the fixing point 6a of the lever by the location tracing device 400. Therefore, the rotation range as described above can be implemented with less than 3 motors, which is implemented with 7 motors or more provided with a plurality of shafts according to a conventional art. According to the configuration as described above, the motors are provided on each up down, left right and front and rear shafts, or provided on some rotation shafts that are selected, and if necessary, the large projection screen image device can be rotated by an manual operation of the user 1 who seats on the rotation chair 100 without the motors.

According to a conventional art, the simulator raises or lowers an internal cylinder by using 6 shafts and thus it needs a large amount of power and driving force and has to ensure height interval for an inclination, thereby causing the height of the device itself to be very high.

However, according to the present invention, the chair and the large screen are arranged symmetrically on the left and the right location of a lever having a seesaw structure based on the fixing point of the lever so that the device can be rotated with 2-3 propulsion powers ½ to ⅒ times as the conventional art. Meanwhile, since the height space for the tilt is not necessary, the total height of the device can be reduced to less than the height ¼ times as the conventional art and the volume thereof can be reduced to less than the volume ½ times as the conventional art.

Accordingly, the large projection screen image device can be applied to various virtual reality image devices for a virtual reality experience, a virtual reality game, a virtual reality game, etc.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A large projection screen image device with a seesaw structure for virtual reality comprising:
    a lever arranged horizontally;
    a fixing point set on a weight center of the lever;
    a chair on which a user sits, a projector and a control box provided at a front of the chair, which are provided on a side of the lever based on the fixing point;
    an image device consisting of a large screen or a monitor, which is provided on the other side of the lever;
    a front rear rotation shaft that is rotatable up and downward in front and rear directions at the fixing point; and
    a left right rotation shaft through which a whole structure of the lever is rotated left and rightward, which is provided below the front rear rotation shaft, wherein 2D or 3D image provided in accordance to the rotation movement of the chair on which the user sits is viewed.

2. The large projection screen image device with a seesaw structure for virtual reality of claim 1, further comprising a location tracing device consisting of a gyroscope, an acceleration sensor, a magnetic sensor, GPS, or a smart phone or tablet personal computer into which the location tracing device is embedded as one of the location tracing devices, wherein the location tracing device is disposed on one of the chair, the projector, the screen, the control box and the lever.

3. The large projection screen image device with a seesaw structure for virtual reality of claim 2, wherein a screen device is provided with a rear screen, a reflection mirror and the projector for implementing 2D or 3D image.

4. The large projection screen image device with a seesaw structure for virtual reality of claim 1, further comprising an up down rotation plate at an intersection location of the lever and the front rear rotation shaft, which allows the lever to be rotatable up and downward at an oblique angle based on the left and right directions.

5. The large projection screen image device with a seesaw structure for virtual reality of claim 4, wherein a screen device is provided with a rear screen, a reflection mirror and the projector for implementing 2D or 3D image.

6. The large projection screen image device with a seesaw structure for virtual reality of claim 1, wherein electric motors are connected to each of the front rear rotation shaft, the left right rotation shaft and the up down rotation plate and are connected to the control box for controlling their front rear, left right and up down rotations.

7. The large projection screen image device with a seesaw structure for virtual reality of claim 6, wherein a screen device is provided with a rear screen, a reflection mirror and the projector for implementing 2D or 3D image.

8. The large projection screen image device with a seesaw structure for virtual reality of claim 7, wherein the screen device is configured such that the screen is provided on a ceiling direction, the reflection mirror is provided at an oblique angle at a middle and the projector for projecting 2D or 3D images at a bottom.

9. The large projection screen image device with a seesaw structure for virtual reality of claim 1, wherein a screen device is provided with a rear screen, a reflection mirror and the projector for implementing 2D or 3D image.

10. The large projection screen image device with a seesaw structure for virtual reality of claim 9, wherein the screen device is configured such that the screen is provided on a ceiling direction, the reflection mirror is provided at an oblique angle at a middle and the projector for projecting 2D or 3D images at a bottom.

11. The large projection screen image device with a seesaw structure for virtual reality of claim 9, wherein the screen device is configured such that the reflection mirror is provided on a lower front surface of the screen and the projector is provided on a lower rear surface of the screen for projecting 2D or 3D image.

12. A large projection screen image device with a seesaw structure for virtual reality comprising:
    a chair configured as a seesaw structure having a lever and a fixing point of the lever, which is provided horizontally on one side of the lever;
    a dome screen on which 2D or 3D images are projected;
    an equilibrium weight pendulum provided on the other side of the lever;
    a front rear rotation shaft provided on the fixing point of the lever; and
    a left right rotation shaft provided below the front rear rotation shaft, wherein the 2D or 3D images are viewed on the dome screen at the corresponding angles to the view direction of the user on the chair who rotates.

13. The large projection screen image device with a seesaw structure for virtual reality of claim 12, further comprising a location tracing device consisting of a gyroscope, an acceleration sensor, a magnetic sensor, GPS, or a smart phone or tablet personal computer into which the location tracing device is embedded as one of the location tracing devices, wherein the location tracing device is disposed on one of the chair, the projector, the screen, the control box and the lever.

14. The large projection screen image device with a seesaw structure for virtual reality of claim 13, wherein electric motors are connected to each of the front rear rotation shaft, the left right rotation shaft and the up down rotation plate and are connected to the control box for controlling their front rear, left right and up down rotations of the chair.

15. The large projection screen image device with a seesaw structure for virtual reality of claim 13, further comprising: a half-transparent mirror through which a part of the image is transmitted and a part thereof is reflected, which is provided between the fixing point of the lever and the dome screen; and a second image screen provided below the half-transparent mirror, wherein a user views simultaneously the image on the half-transparent mirror and the image on the dome screen, which are rotated together with the user.

16. The large projection screen image device with a seesaw structure for virtual reality of claim 12, wherein electric motors are connected to each of the front rear rotation shaft, the left right rotation shaft and the up down rotation plate and are connected to the control box for controlling their front rear, left right and up down rotations of the chair.

17. The large projection screen image device with a seesaw structure for virtual reality of claim 12, further comprising: a half-transparent mirror through which a part of the image is transmitted and a part thereof is reflected, which is provided between the fixing point of the lever and the dome screen; and a second image screen provided below the half-transparent mirror, wherein a user views simultaneously the image on the half-transparent mirror and the image on the dome screen, which are rotated together with the user.

* * * * *